(12) United States Patent
Wirth et al.

(10) Patent No.: US 8,302,391 B2
(45) Date of Patent: Nov. 6, 2012

(54) MIXING AND/OR EVAPORATING DEVICE AND PROCESS FOR MANUFACTURING SAME

(75) Inventors: Georg Wirth, Kirchheim/Teck (DE); Felix Neumann, Esslingen (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 1156 days.

(21) Appl. No.: 12/140,575

(22) Filed: Jun. 17, 2008

(65) Prior Publication Data

US 2008/0308083 A1 Dec. 18, 2008

(30) Foreign Application Priority Data

Jun. 18, 2007 (DE) .......................... 10 2007 028 449

(51) Int. Cl.
*F01N 3/00* (2006.01)
(52) U.S. Cl. ................................ 60/324; 60/295; 60/301
(58) Field of Classification Search .................... 60/317, 60/324; 123/590, 592; 29/889; 416/204 A; 366/339; 48/189.4
See application file for complete search history.

(56) References Cited

U.S. PATENT DOCUMENTS

| 4,012,907 | A | * | 3/1977 | Crayton | .......................... 60/315 |
| 4,515,138 | A | | 5/1985 | Agadi | |
| 4,600,544 | A | * | 7/1986 | Mix | .......................... 261/79.2 |
| 4,848,920 | A | | 7/1989 | Heathe et al. | |
| 4,929,088 | A | | 5/1990 | Smith | |
| 6,109,781 | A | | 8/2000 | Ogasawara et al. | |
| 6,431,528 | B1 | * | 8/2002 | Kojima | .......................... 261/79.2 |
| 6,444,177 | B1 | * | 9/2002 | Muller et al. | .................. 422/177 |
| 6,536,420 | B1 | * | 3/2003 | Cheng | .......................... 123/590 |
| 6,550,446 | B1 | * | 4/2003 | Robley, Jr. | ..................... 123/306 |
| 6,796,296 | B2 | * | 9/2004 | Kim | ................................ 123/590 |
| 6,837,213 | B1 | * | 1/2005 | Burnett | .......................... 123/306 |
| 7,055,512 | B2 | * | 6/2006 | Leuenberger | ................. 123/590 |
| 7,128,049 | B2 | * | 10/2006 | Doucet | .......................... 123/306 |
| 7,267,098 | B1 | * | 9/2007 | Tasanont | ....................... 123/306 |
| 7,364,601 | B2 | * | 4/2008 | Xu et al. | .......................... 55/320 |
| 7,434,658 | B2 | | 10/2008 | Staut | |
| 7,510,172 | B2 | * | 3/2009 | Kojima | .......................... 261/79.2 |
| 7,533,520 | B2 | * | 5/2009 | Cheng et al. | .................... 60/286 |
| 7,797,937 | B2 | * | 9/2010 | Endicott et al. | ............. 60/605.1 |
| 7,805,932 | B2 | * | 10/2010 | Oxborrow | ....................... 60/324 |
| 7,975,991 | B2 | * | 7/2011 | Kojima | .......................... 261/79.2 |
| 2003/0070424 | A1 | * | 4/2003 | Verdegan et al. | ............... 60/286 |
| 2003/0213234 | A1 | * | 11/2003 | Funk et al. | ....................... 60/286 |
| 2003/0226539 | A1 | | 12/2003 | Kim | |
| 2007/0205523 | A1 | * | 9/2007 | Kojima | .......................... 261/79.2 |

(Continued)

FOREIGN PATENT DOCUMENTS

| DE | 101 44 827 A1 | 3/2003 |
| DE | 102 39 417 | 3/2004 |

(Continued)

*Primary Examiner* — Thomas Denion
*Assistant Examiner* — Patrick Maines
(74) *Attorney, Agent, or Firm* — McGlew and Tuttle, P.C.

(57) ABSTRACT

A mixing and/or evaporating device (7) is provided for an exhaust system (3) of an internal combustion engine (1), especially in a motor vehicle. The mixing and/or evaporating device (7) has a tubular body (8), at one axial end of which a plurality of blades (9) are arranged, which blades are located adjacent to each other in the circumferential direction, project radially inwardly and have angles of incidence in relation to one another in the axial direction. For manufacture at a low cost, the tubular body (8) is manufactured together with the blades (9) from a single sheet metal body (11) by shaping.

16 Claims, 8 Drawing Sheets

U.S. PATENT DOCUMENTS

2008/0079179 A1 4/2008 Lundgreen et al.
2008/0184700 A1* 8/2008 Harrer .................. 60/295
2008/0267780 A1 10/2008 Wirth
2009/0084088 A1* 4/2009 Ichikawa et al. ........... 60/295

FOREIGN PATENT DOCUMENTS

| | | |
|---|---|---|
| DE | 102006011890 | 9/2007 |
| EP | 1 371 824 A1 | 12/2003 |
| EP | 1 657 414 | 5/2006 |
| EP | 1 835 139 | 9/2007 |
| EP | 1 953 359 | 8/2008 |
| EP | 1 985 356 | 10/2008 |
| FR | 2 384 206 | 10/1978 |
| WO | WO 03/036054 A1 | 5/2003 |

* cited by examiner

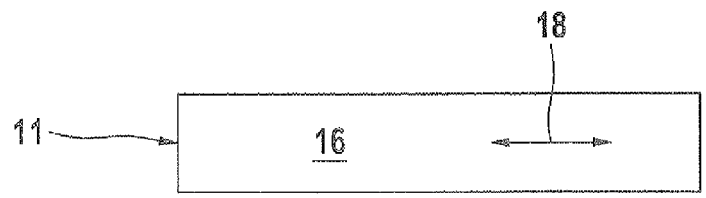
Fig. 9a
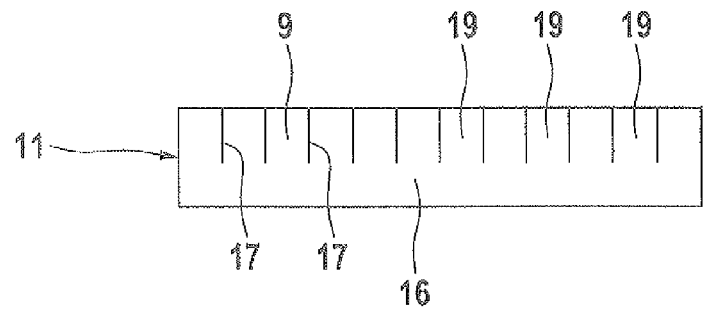
Fig. 9b
Fig. 9c
Fig. 9d
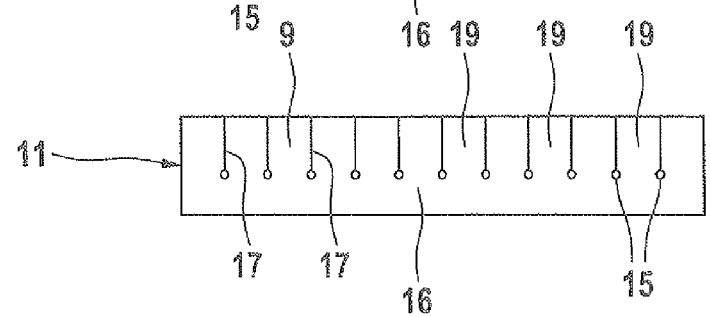
Fig. 9e
Fig. 9f
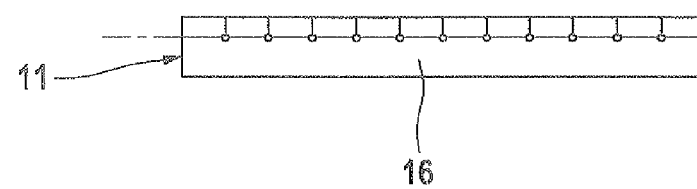
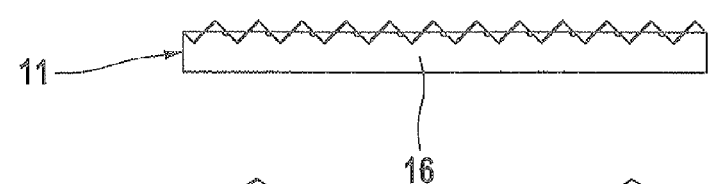
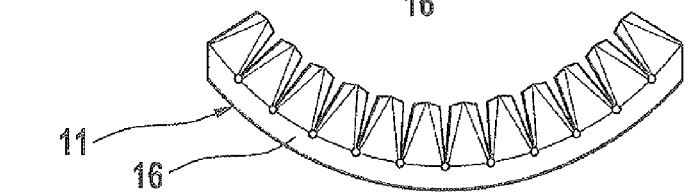
Fig. 9g

MIXING AND/OR EVAPORATING DEVICE AND PROCESS FOR MANUFACTURING SAME

CROSS REFERENCE TO RELATED APPLICATIONS

This application claims the benefit of priority under 35 U.S.C. §119 of German Patent Application 10 2007 028 449.9 filed Jun. 18, 2008, the entire contents of which are incorporated herein by reference.

FIELD OF THE INVENTION

The present invention pertains to a mixing and/or evaporating device for an exhaust system of an internal combustion engine, especially in a motor vehicle. The present invention pertains, in addition, to a process for manufacturing such a mixing and/or evaporating device as well as an exhaust system equipped with such a mixing and/or evaporating device.

BACKGROUND OF THE INVENTION

It may be necessary for various reasons in exhaust systems of internal combustion engines to inject a liquid educt into the exhaust gas stream. For example, fuel may be injected into the exhaust gas stream upstream of an oxidation catalyst in order to induce an exothermal combustion reaction at an oxidation catalyst arranged downstream. For example, a reducing agent, e.g., ammonia, may likewise also be injected into the exhaust gas stream in order to reduce nitrogen oxides being carried by the exhaust gas in an SCR catalyst arranged downstream. Instead of ammonia, urea or an aqueous urea solution may also be injected into the exhaust gas stream. Ammonia and water will then form from the urea-water solution by a hydrolysis reaction. Furthermore, a fuel or another suitable reducing agent may be injected into the exhaust gas stream upstream of an NOx storage catalyst in order to regenerate the NOx storage catalyst.

To improve or make possible the mode of action of the educt injected in the liquid form into the exhaust gas line, extensive evaporation is just as desirable as a thorough mixing with the exhaust gas in order to thus obtain the most homogeneous exhaust gas-educt mixture possible. The exhaust system may be equipped for this with a mixing and/or evaporating device arranged in the exhaust gas line downstream of the injection means.

Depending on the injection means used, the educt may be introduced in the form of a liquid jet, which flares up in a conical shape. Low exhaust gas temperatures and low flow velocities prevail at low engine loads and exhaust gas temperatures. The liquid jet can subsequently impact on a corresponding structure of the mixing and/or evaporating device. Depending on the design of the mixing and/or evaporating device, the liquid jet may pass through the particular structure of the mixing and/or evaporating device at least partially and then reach in the liquid form an exhaust gas treatment means, at which the injected liquid shall only arrive in the form of the most homogeneous gas mixture possible. The consequence is a reduced mode of action as well the risk of damage.

SUMMARY OF THE INVENTION

The present invention pertains to the object of providing an improved embodiment for a mixing and/or evaporating device or an exhaust system equipped therewith or for a corresponding manufacturing process, which improved embodiment is characterized especially by the possibility of manufacture at a low cost. In addition, improved evaporating action may be desirable.

The present invention is based on the general idea of manufacturing the mixing and/or evaporating device from a single sheet metal body only, on which a tubular body and blades projecting therefrom radially inwardly are formed for this purpose. The mixing and/or evaporating device can be manufactured at a comparatively low cost as a result. The blades are arranged and designed according to the present invention specifically in such a way that they have an angle of incidence in relation to the axial direction of the tubular body. The resistance to flow is increased hereby in the area of the blades and a twist is generated. The twist in the exhaust gas stream generates swirling, which supports the evaporation of the possibly liquid educt, on the one hand, and improves the homogenization of the mixture, on the other hand.

The blades may be advantageously arranged and designed such that they overlap in the circumferential direction, doing so such that a coaxially arranged composite surface, which blocks a straight line path in the axial direction, is formed. Breakthrough of liquid droplets through the mixer structure is avoided due to the formation of such an axial path blocking surface. The droplets impact on the blades in the surface and can evaporate more easily as a result.

According to a variant, the blades may be designed and arranged such that the surface formed by the overlapping of the blades is an annular surface, which encloses a central core area. It becomes possible as a result to design the core area and the annular surface differently from the fluidic point of view. In particular, it is possible to design and arrange the blades such that a lower resistance to flow will become established in the core area than in the area of the annular surface. The pressure can be lowered as a result in the core area, which can be utilized to accelerate the flow of the exhaust gas in the center. The increased velocity of flow in the center facilitates the evaporation of the liquid jet. It is especially advantageous now to direct the liquid jet such that it will reach the blades radially outside the central core area.

To reduce the resistance to flow in the core area compared to the area of the annular surface, provisions may be made to design the core area as a central passage opening, which is free or open axially. As an alternative, the core area may also be made essentially a straight line axial area block in order to make it possible to effectively avoid breakthrough of liquid droplets here as well. An axial path blocking core area with reduced resistance to flow compared to the annular surface can be obtained, for example, such that not all but only some of the blades extend up into the core area and/or that the blades overlap less extensively in the core area than in the annular surface. In particular, provisions may be made for the blades, which extend up into the core area, not to overlap in the core area in the circumferential direction but to be arranged only next to each other.

Other important features and advantages of the present invention appear from the from the drawings and from the corresponding description of the figures on the basis of the drawings. It is apparent that the above-mentioned features, which will still be explained below, are applicable not only in the particular combination indicated, but in other combinations or alone as well, without going beyond the scope of the present invention.

Preferred exemplary embodiments of the present invention are shown in the drawings and will be explained in more detail below, identical reference numbers designating identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6a is a view as in FIG. 3, but for an embodiment according to FIG. 5a;

FIG. 6b is a view as in FIG. 6a, but with a symbolically indicated annular surface;

FIG. 9a is a view of a sheet metal body in one of different states within the framework of the manufacture of a mixing and/or evaporating device according to FIGS. 2 through 4;

FIG. 9b is a view of a sheet metal body in another of different states within the framework of the manufacture of a mixing and/or evaporating device according to FIGS. 2 through 4;

FIG. 9c is a view of a sheet metal body in another of different states within the framework of the manufacture of a mixing and/or evaporating device according to FIGS. 2 through 4;

FIG. 9d is a view of a sheet metal body in another of different states within the framework of the manufacture of a mixing and/or evaporating device according to FIGS. 2 through 4;

FIG. 9e is a view of a sheet metal body in another of different states within the framework of the manufacture of a mixing and/or evaporating device according to FIGS. 2 through 4;

FIG. 9f is a view of a sheet metal body in another of different states within the framework of the manufacture of a mixing and/or evaporating device according to FIGS. 2 through 4;

FIG. 9g is a view of a sheet metal body in another of different stats within the framework of the manufacture of a mixing and/or evaporating device according to FIGS. 2 through 4;

DESCRIPTION OF THE PREFERRED EMBODIMENTS

Figure 1:
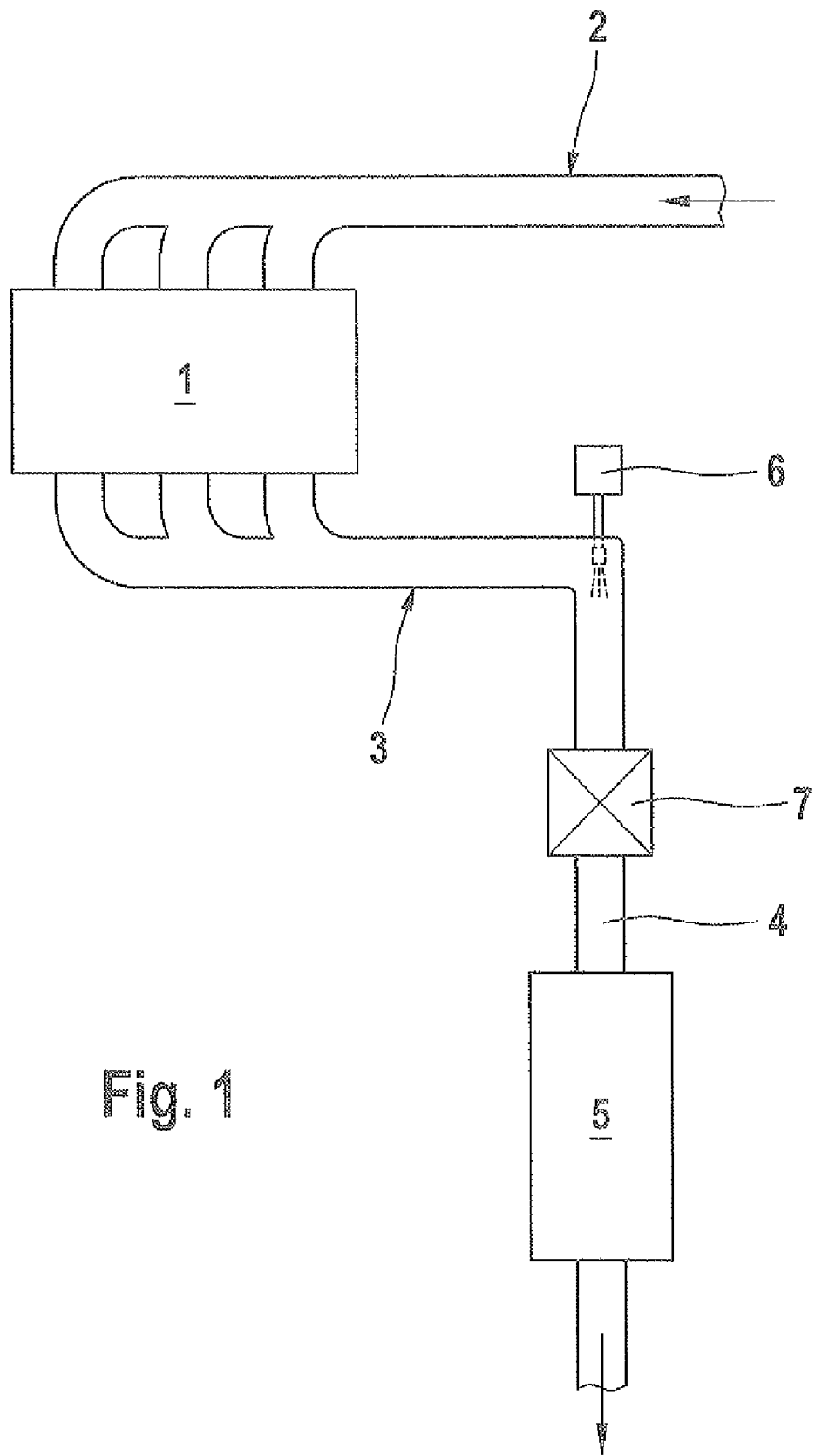
FIG. 1 is a greatly simplified schematic view of an exhaust system.

Referring to the drawings in particular, FIG. 1 shows an internal combustion engine 1, which may be arranged, for example, in a motor vehicle, and has a fresh gas system 2 for being supplied with fresh gas, preferably air, and an exhaust system 3 for removing exhaust gas. Such an exhaust system 3 comprises an exhaust gas line 4, which removes the exhaust gas formed in the internal combustion engine 1 during the operation of the internal combustion engine 1 from the internal combustion engine 1. The exhaust system 3 may have at least one exhaust treatment means 5, which is arranged in the exhaust gas line 4. This exhaust gas treatment means 5 may be, e.g., an oxidation catalyst, an NOx storage catalyst, a hydrolysis reactor, an SCR catalyst or a particle filter. One or more of the means may likewise be accommodated in a common housing, especially in conjunction with a muffler. Furthermore, the exhaust system 3 has an injection means 6, which is designed to inject a liquid educt into the exhaust gas line 4. The injection means 6 is arranged at the exhaust gas line 4 upstream of the exhaust gas treatment means 5. The liquid educt may be preferably fuel, especially the same fuel with which the internal combustion engine 1 is also operated. Furthermore, the educt may also be ammonia or urea or an aqueous urea solution. If fuel injection is provided for, the exhaust gas treatment means 5 arranged directly adjacent downstream of the injection means 6 is preferably an oxidation catalyst, at which a reaction of the fuel takes place at elevated temperature, for example, in order to bring the oxidation catalyst to its operating temperature or in order to heat a particle filter arranged downstream of the oxidation catalyst to a regeneration temperature. If the injection means 6 is designed to inject ammonia, the exhaust gas treatment means 5 may be an SCR catalyst. If urea or a urea-water solution is injected, the exhaust gas treatment means 5 arranged directly downstream may be a hydrolysis reactor or hydrolysis catalyst, in which the urea is converted into ammonia in order to be admitted into a downstream SCR catalyst. The injection means 6 may also be followed directly by an exhaust gas treatment means 5 designed as an SCR catalyst, in which the hydrolysis reaction additionally takes place. In addition, any other application of the injection of a liquid educt into the exhaust gas line 4 directly downstream of an exhaust gas treatment means 5 is conceivable.

According to FIG. 1, an axial orientation of the educt jet is preferred for the injection of the educt, which can be embodied, as an example, by a corresponding bend in the exhaust gas line 4.

To make it possible to evaporate the liquid educt injected as rapidly and as completely as possible in the exhaust gas and in order to nix the evaporated educt as homogeneously as possible with the exhaust gas, the exhaust system 3 is equipped with a mixing and/or evaporating device 7, which is arranged in the exhaust gas line 4 downstream of the injection means 6 and preferably upstream of or directly at or in the exhaust gas treatment means 5 located adjacent to the injection means 6.

Preferred embodiments of the mixing and/or evaporating device 7, which will hereinafter also be called device 7 for short, will be explained in more detail below with reference to FIGS. 2 through 8.

Corresponding to FIGS. 2 through 8, a device 7 comprises a tubular body 8, which is preferably cylindrical, especially regular (circular) cylindrical in shape. At its axial ends, the tubular body 8 has a plurality of blades 9, which likewise form a part of the device 7. The blades 9 are arranged adjacent to each other in the circumferential direction and project radially inwardly from the tubular body 8. The blades 9 have an angle of incidence in relation to the axial direction of the tubular body 8. This means that the particular blade 9 has a leading edge and a trailing edge, which are located at spaced locations from one another in respect to the circumferential direction. The particular blade 9 correspondingly has cross-sectional profiles, whose longitudinal direction extends sloped in relation to the axial direction. Due to the angle of incidence of the blades 9, a twist can be imposed on the flow when it is flowing through the device 7.

It is especially advantageous now that the particular tubular body 8 is manufactured, together with all blades 9, from a single sheet metal body 11, doing so by shaping corresponding areas of this sheet metal body 11. The particular device 7 is consequently a sheet metal shaped body manufactured from one piece.

In the preferred embodiments shown here, the blades 9 are designed and arranged such that they mutually overlap in the circumferential direction, doing so such that a composite surface 12 is formed, which is axial path blocking in the axial direction. This axial path blocking surface 12 may be shaped, in principle, as a circular surface due to a corresponding design and arrangement of the blades 9. Breakthrough of droplets through the device 7 can be avoided as a result especially effectively. As an alternative, the blades 9 may also be arranged and designed such that surface 12 is, as in the embodiments being shown here, an annular surface, which will hereinafter likewise be designated by 12. The annular surface 12 encloses a central core area 10. Due to a specific design, i.e., shaping and arrangement of the blades 9, the fluidic properties of the device 7 can now be made different in this core area 10 as well as in the area of the annular surface 12. Preferred in this connection are the embodiments being shown here, in which the blades 9 are designed and arranged such that a lower value becomes established for the resistance to flow of the device 7 in the core area 10 than in the area of the annular surface 12. The pressure decreases as a result in the core area 10, which leads to an acceleration of the flow. The increased flow velocity supports the evaporation, on the one hand, and mixture formation, on the other hand.

In the embodiments according to FIGS. 2 through 7, the resistance to flow is reduced in the core area compared to the area of the annular surface 12 by the core area 10 forming a central passage opening 21. This passage opening 21 is axially free or open and correspondingly has a markedly lower resistance to flow compared to the axial path blocking annular surface 12. The central passage opening 21 is embodied by all blades 9 with their free ends extending only within the annular surface 12 and each ending at the core area 10. In particular, all blades 9 are of an identical shape.

Figure 8:
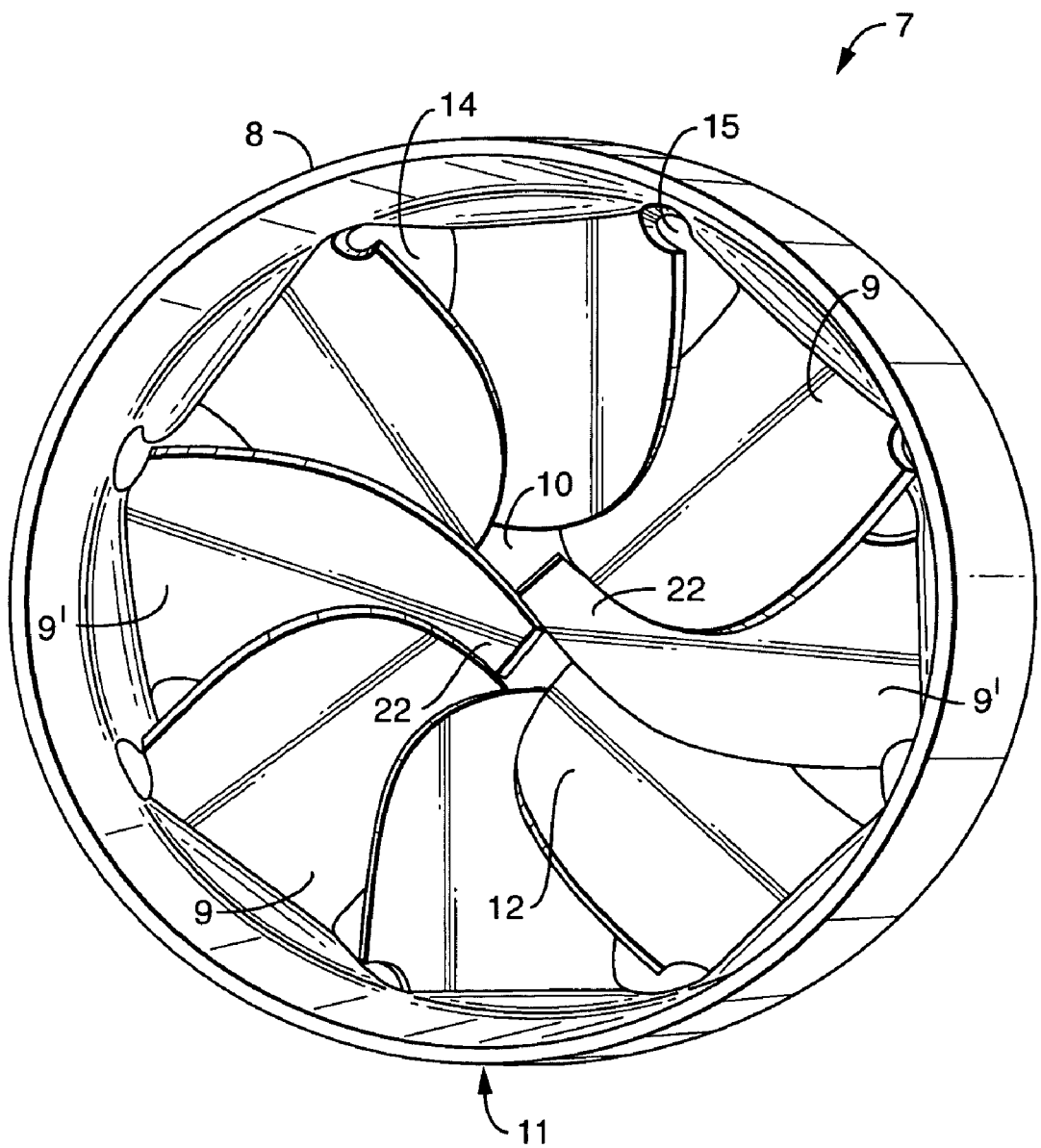
FIG. 8 is a view of a mixing and/or evaporating device as in FIG. 5, but for another embodiment.

Contrary to this, the core area 10 can also be made extensively axial path blocking in the axial direction in the embodiment shown in FIG. 8 thanks to a corresponding design and arrangement of the blades 9. Some, but not all blades 9 also extend for this up into the core area 10. These radially longer blades will hereinafter be designated by 9'. To make it possible to make the resistance to flow lower in the core area 10 than in the adjacent area of the annular surface 12, provisions may be made, for example, for the blades 9', which extend in the core area 10, not to overlap in the circumferential direction or to overlap less than in the area of the annular surface 12. If these blades 9' do not overlap in the core area 10 in the circumferential direction, they are preferably arranged next to each other in respect to the circumferential direction in order to make it possible to attain the designed axial path blocking in the axial direction.

In the preferred example being shown, exactly two blades 9' are made radially longer, without limitation of the general nature, than the other blades 9. The free blade ends of these blades 9' are extended in the radial direction by extensions 22 compared to the free ends of the other blades 9. These extensions 22, which are made integrally in one piece with the respective blades 9', may project radially over a center of the surface 12 or of the device 7, which said center is not shown here. This means that the radial length of the particular blade 9' is greater than the radius of the regular cylindrical tubular body 8. At any rate, these blades 9' with the extensions 22 protrude into the core area 10, whereas all other blades 9 with their free ends end each at the core area 10.

The two blades 9' provided with the extensions 22 are arranged diametrically opposite each other at the tubular body 8. The extensions 22 may be oriented such that they are rotationally symmetrical in respect to the center of the tubular body 8. The two blades 9' may slightly overlap in the area of their extensions 22 in the circumferential direction, but they are preferably free from overlapping in the circumferential direction, i.e., they are arranged next to each other. The radially longer blades 9' are especially twisted uniformly up to the extensions 22, so that the twisting of this blade 9' is smallest in the core area, as a result of which the resistance to flow through the blades 9' is lowest in the center.

Figure 2:
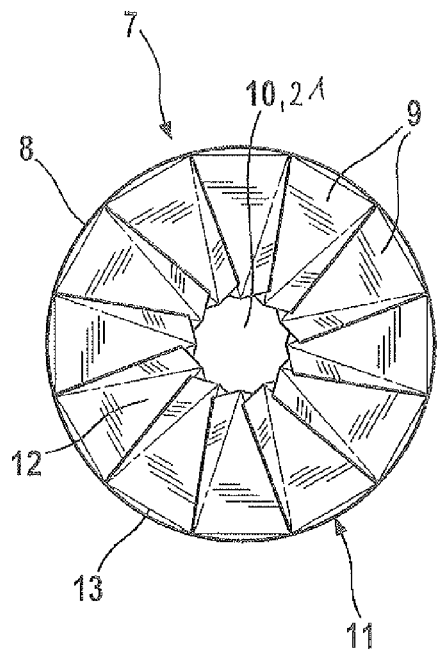
FIG. 2 is an axial view of a mixing and/or evaporating device.
Figure 3:
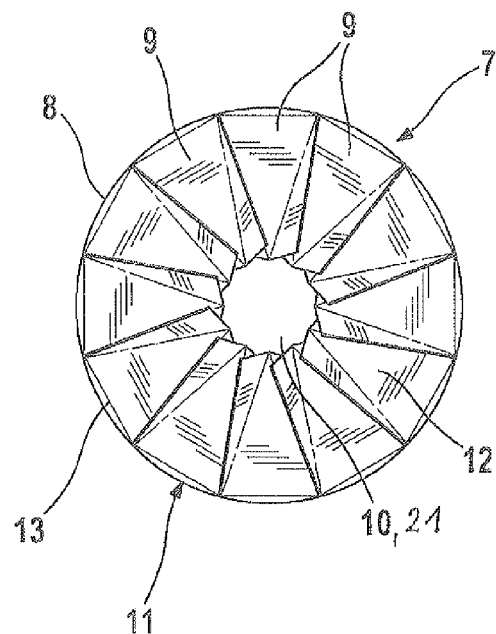
FIG. 3 is an axial view as in FIG. 2, but in the opposite direction of view.
Figure 4:
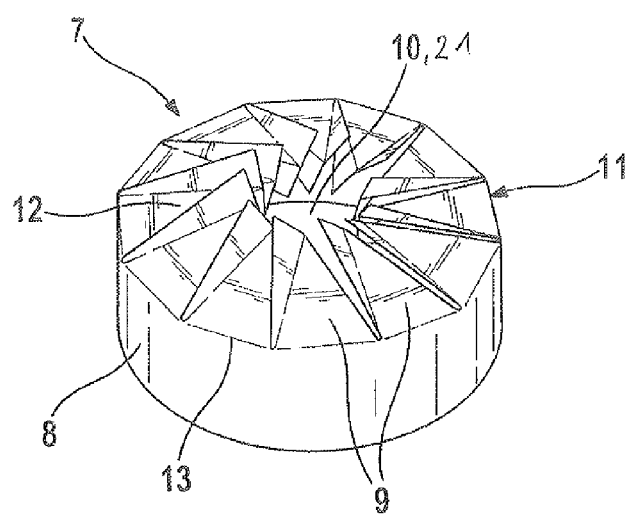
FIG. 4 is a perspective view of the mixing and/or evaporating device shown in FIGS. 2 and 3.

The blades 9 are designed and arranged in the embodiments shown in FIGS. 2 through 4 such that the axial path blocking annular surface 12 extends radially up to the annular body 8. Consequently, the axial path blocking annular surface 12 is limited in this embodiment by the central passage opening 10 radially inwardly and by the tubular body 8 radially outwardly.

To design such an axial path blocking annular surface 12, the blades 9 are designed radially outwardly at a transition 13 to the tubular body 8 in the embodiment according to FIGS. 2 through 4 such that they are located there with their cross-sectional profile in a plane that extends essentially at right angles to the axial direction of the tubular body 8. As a result, the adjacent blades 9 can mutually overlap from the central passage opening 10 up to the tubular body 8. This mutual overlap in the axial direction leads to the desired axial path blocking of the annular surface 12 in the axial direction.

FIGS. 5 through 8 show other embodiments of device 7. The blades 9 and 9', respectively, are arranged and designed in these embodiments such that free gaps 14 are formed axially radially outside the axial path blocking annular surface 12 between blades 9 and 9', which are adjacent to one another in the circumferential direction. These gaps 14 are arranged distributed around the axial path blocking annular surface 12 in the circumferential direction and generate a relative pressure drop there, as a result of which device 7 has a reduced resistance to flow. The annular surface 12, which is axial path blocking in the axial direction, is limited here radially inwardly essentially by the central passage opening 21 and by the core area 10 and radially outwardly by another annular area, which extends up to the tubular body 8 and which contains the gaps 14.

This mode of construction with the axially free gaps 14 can be preferably obtained by the blades 9 being located radially on the outside at the transition 13 to the tubular body 8 with their respective cross-sectional profile in a plane that is sloped relative to a plane extending at right angles to the axial direction. This slope may be, for example, between 20° and 70°. This slope is preferably about 45° in the example being shown.

In the embodiments according to FIGS. 2 through 8, the blades 9 may be designed such that their angle of incidence in relation to the axial direction changes radially along the respective blade 9, 9'. The change in the angle of incidence may be continuous, as a result of which the blades 9, 9' have a twist. The change in the angle of incidence may also take place in increments. Partial areas within the respective blades 9, 9' may be bent for this slightly in relation to the rest of the respective blade 9, 9'. Preferred here is an embodiment in which the angle of incidence of the blades 9, 9' decreases along the blade 9, 9' radially from the outside to the inside. In the ideal case, the blades 9, 9' have no angle of incidence radially on the inside, i.e., at the transition to the central core area 10, as a result of which their cross-sectional profile extends there essentially in parallel to the axial direction. The maximum angle of incidence now occurs radially outside in the area of the tubular body 8. This maximum angle of incidence is about 45° in the embodiment being shown in FIGS. 5 through 8. In the embodiment shown in FIGS. 2 through 4, the blades 9 have an angle of incidence of about 90° in relation to the axial direction radially outside.

To increase the fatigue strength of the mixing and/or evaporating device 7, the individual blades 9 adjacent to each other in the circumferential direction may border on each other radially outside at the transition 13 to the tubular body 8 via a rounded opening 15 each. These rounded openings 15 can be better recognized, e.g., in FIGS. 9c, 9d as well as 10c and 10d. The rounded openings 15 are used to reduce stresses within the sheet metal body 11 in order to reduce risk of cracking.

Embodiments in which the blades 9, 9' are designed and arranged such that they do not touch each other are especially advantageous. Advantageous here is a variant in which the blades 9, 9' do not touch each other even if the device 7 has been heated to the operating temperature, which may be comparatively high in an exhaust system 3. Damage and disturbing noise generation within the device 7 can be avoided due to this contact-free mode of construction.

A preferred process for manufacturing the mixing and/or evaporating device 7 will be explained in more detail below on the basis of FIGS. 9 and 10.

Corresponding to FIG. 9a, the sheet metal body 11, from which the tubular body 8 and the blades 9 are ultimately formed by shaping, is an essentially flat sheet metal strip 16 in an initial state. Cuts 17 are now made in this sheet metal strip 16 according to FIG. 9b. The cuts 17 are placed on the side without the cuts 17 passing through the sheet metal strip 16. The individual cuts 17 extend in parallel to one another and are sloped in relation to the longitudinal direction of the sheet metal strip 16. The longitudinal direction of the sheet metal strip 16 is defined by the circumferential direction of the tubular body 8 thus formed. The longitudinal direction of the sheet metal strip 16 is symbolized by a double arrow and designated by 18 in FIG. 9a.

The rounded openings 15 can subsequently be optionally prepared in the sheet metal strip 16 according to FIG. 9d, such that the openings 15 are arranged each at the end of the cuts 17. The risk of cracking at the end of the respective cut can be reduced hereby. It is also possible as an alternative to prepare first the rounded openings 15 in the sheet metal strip 16 according to FIG. 9c and to prepare the cuts 17 according to FIG. 9d only thereafter so that these end in one of the openings 15. It is also possible, in principle, to prepare the cuts 17 and the openings 15 simultaneously, i.e., by a punching operation, in the sheet metal strip 16.

A plurality of cross strips 19, which are arranged next to each other in the longitudinal direction 18 of the sheet metal strip 16 and which are separated from one another by the cuts 17, are formed by the cuts 17 on the sheet metal strip 16. These cross strips 19 will then later form the blades 9, which are already separated here from each other by the cuts 17. To form the embodiment shown in FIGS. 2 through 4, the cuts 17 are placed here such that they extend at right angles to the longitudinal direction 18 of the sheet metal strip 16.

According to FIG. 9e, the separated blades 9 or the cross strips 19 are subsequently bent over about a bending axis 20 extending at right angles to the cuts 17, so that they project, for example, at right angles from the rest of the sheet metal strip 16. It is clear that other bending angles, which may be greater or also smaller than 90°, are possible here as well.

According to FIG. 9f, the bent or bent-over, separated blades 9 or the cross strips 19 may be provided with varying angles of incidence; for example, the blades 9 are twisted continuously for this. The blades 9 may also be provided with varying angles of incidence in increments by folding of at least one partial area.

According to FIG. 9g, the sheet metal strip 16 is subsequently bent or wound up or rolled up about a bending axis extending in parallel to the axial direction of the tubular body 8 in order to form the tubular body 8 with the rest of the sheet metal strip 16. For example, the sheet metal strip 16 may be welded at a joint or in an overlapping area. Other fixing techniques are conceivable as well. The sheet metal body 11 being shown in FIGS. 2 through 4 is then obtained after winding up according to FIG. 9g.

Figures 5A, 5B:
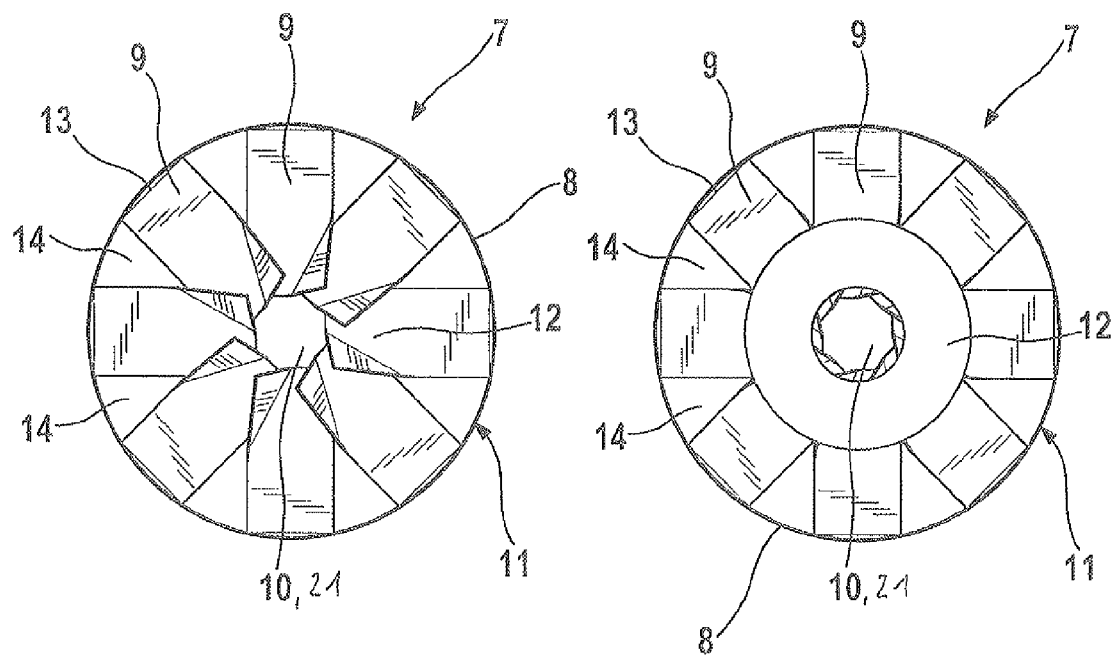
FIG. 5a is a view as in FIG. 2, but for another embodiment.
FIG. 5b is a view as in FIG. 5a, but with a symbolically indicated annular surface.
Figures 6A, 6B:
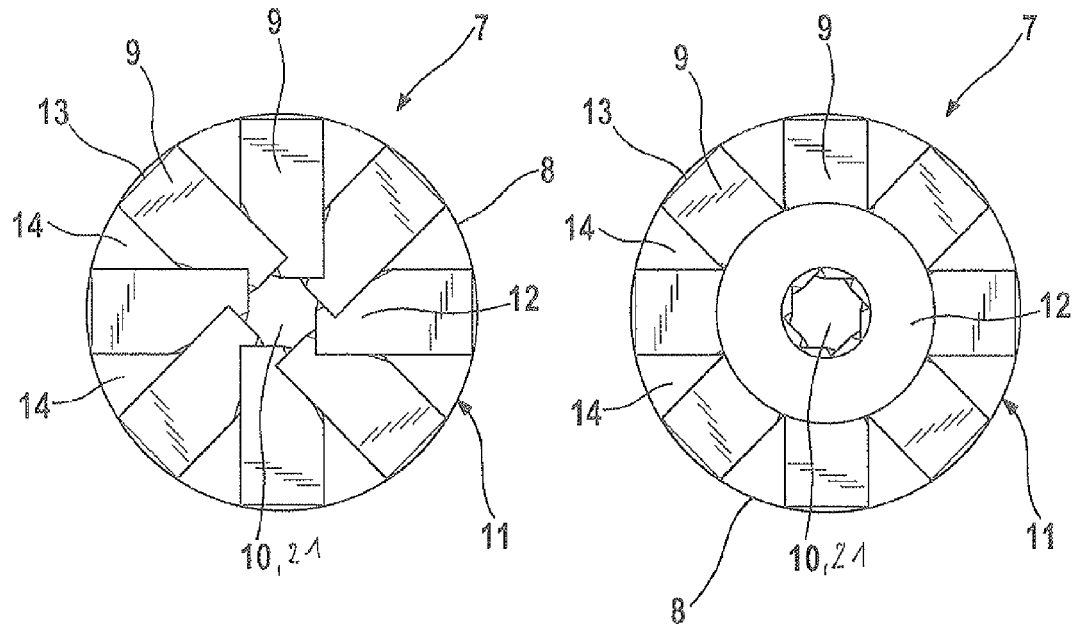
Figure 7:
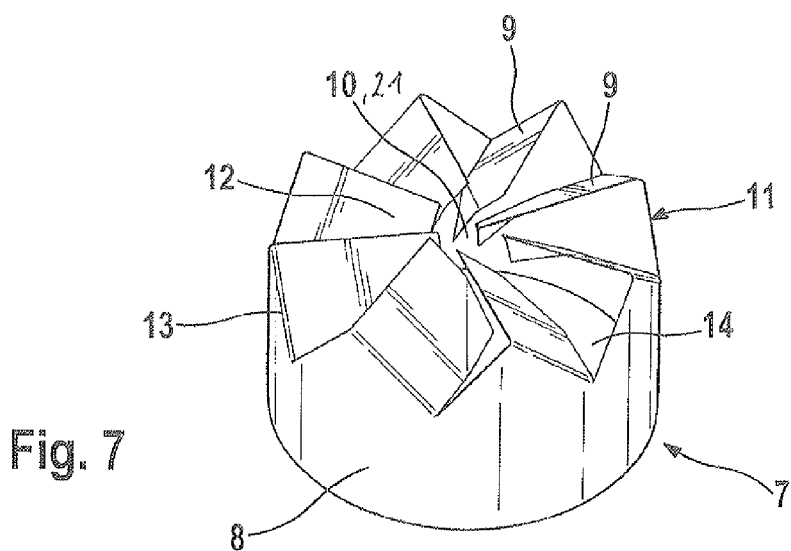
FIG. 7 is a perspective view of the mixing and/or evaporating device according to FIGS. 5 and 6.
Figure 10A:
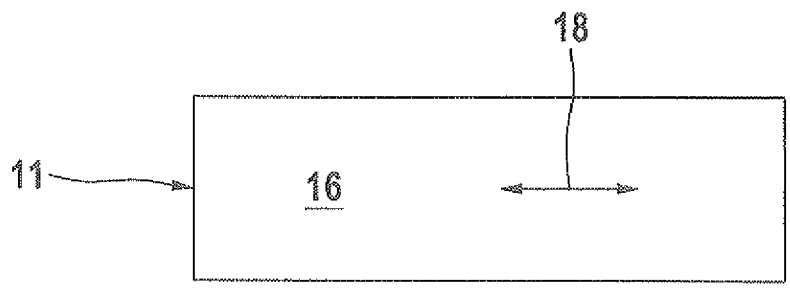
FIG. 10a is a view of a sheet metal body in one of different manufacturing steps of a mixing and/or evaporating device according to FIGS. 5 through 7.
Figure 10B:
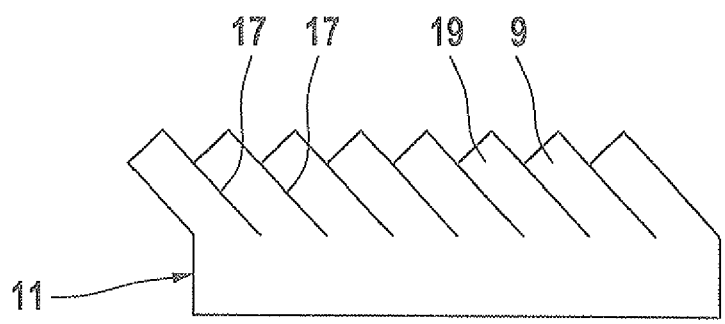
FIG. 10b is a view of a sheet metal body in another of different manufacturing steps of a mixing and/or evaporating device according to FIGS. 5 through 7.
Figure 10C:
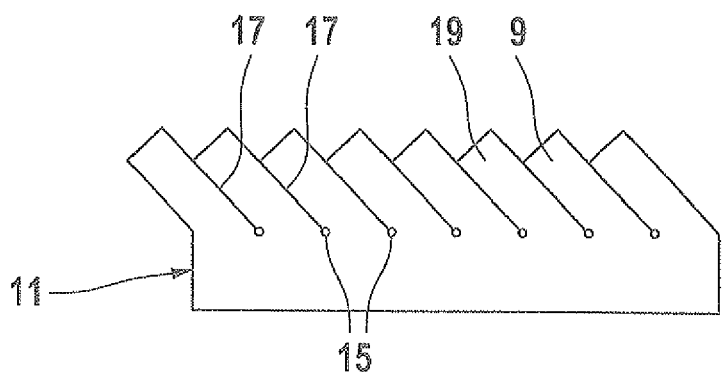
FIG. 10c is a view of a sheet metal body in another of different manufacturing steps of a mixing and/or evaporating device according to FIGS. 5 through 7.

To make it possible to manufacture the embodiment shown in FIGS. 5 through 7, the sheet metal strip 16 shown in FIG. 10a is cut according to FIG. 10e such that the cuts 17 extend with a slope of less than 90° in relation to the longitudinal direction 18 of the sheet metal strip 16. For example, the cuts 17 extend here with a slope of about 45° in relation to the longitudinal direction 18. Other slope angles, for example, between 20° and 70°, are conceivable as well. Waste is generated due to the oblique cuts 17. It is also possible here according to FIG. 10c to place the rounded openings 15 on the sheet metal strip 16 such that the cuts 17 end in these openings 15. It is clear that analogously to the procedure according to FIGS. 9a through 9g, the cuts 17 and the openings 15 can be prepared in the sheet metal strip 16 either simultaneously or in any order one after another.

Figure 10D:
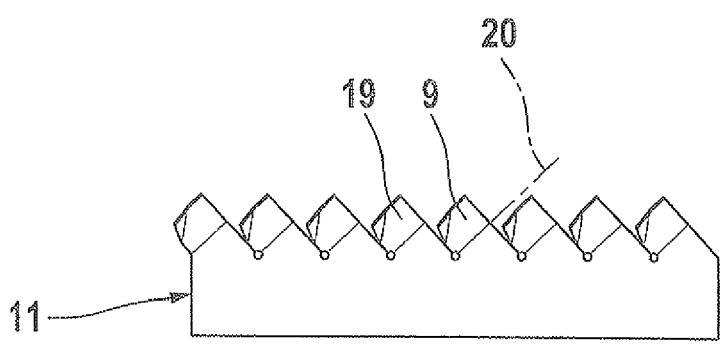
FIG. 10d is a view of a sheet metal body in another of different manufacturing steps of a mixing and/or evaporating device according to FIGS. 5 through 7.

According to FIG. 10d, bending of the separated cross strips 19 or blades 9 again takes place subsequently, every individual blade 9 again being bent about a bending axis 20, which extends at right angles to the direction of cut.

In this embodiment, the blades 9 already have an angle of incidence in relation to the axial direction of the tubular body 8 after bending. Furthermore, the course of the angle of incidence can still be changed along the respective blade 9, for example, by twisting or by changing the angle of incidence in increments, for example, by folding at least one predetermined area within the blades 9. The sheet metal strip 16 thus formed is then wound up as well in order to form the tubular body 8.

Figure 11:
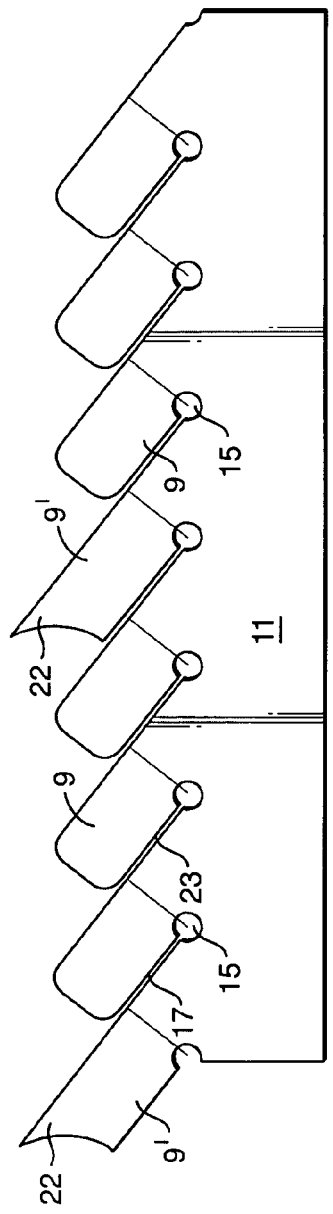
FIG. 11 is a view of a sheet metal body during the manufacture of one of different embodiments of a mixing and/or evaporating device.
Figure 12:
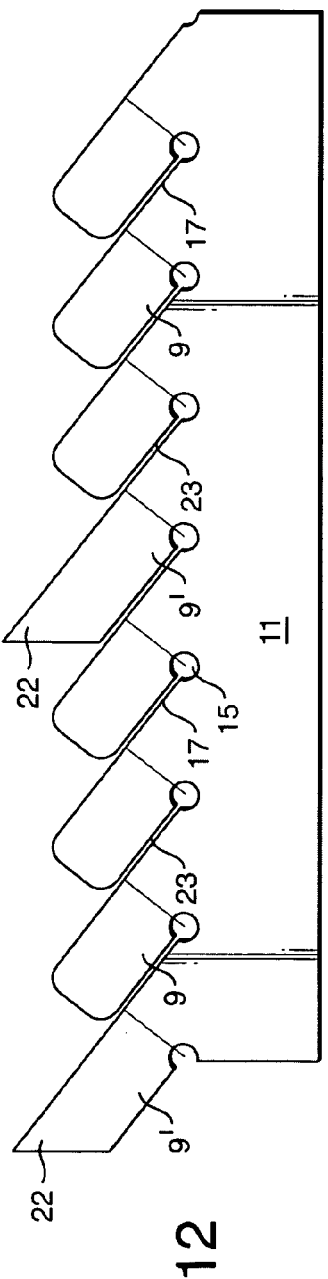
FIG. 12 is a view of a sheet metal body during the manufacture of another of different embodiments of a mixing and/or evaporating device.
Figure 13:
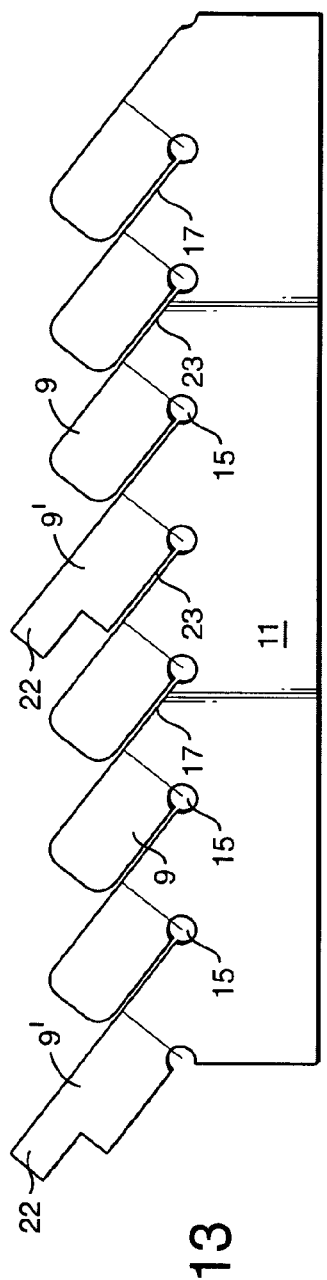
FIG. 13 is a view of a sheet metal body during the manufacture of one another of different embodiments of a mixing and/or evaporating device.

To manufacture the embodiment shown in FIG. 8, the sheet metal strip 16 is processed corresponding to FIGS. 11 through 13 such that when the blades 9 are cut free, the radially longer blades 9', i.e., the blades 9' provided with the extensions 22, are formed as well at the same time. FIGS. 11 through 13 correspond essentially to FIG. 10c, in which the device 7 has, however, blades 9 of equal size or equal length only. In principle, any variant is possible for the geometric shaping of the extensions 22. For example, FIG. 11 shows an embodiment with a rounded or sickle-shaped extension 22 or with an extension 22 tapering to a point. FIG. 12 shows a variant with wedge-shaped extension 22, which likewise tapers to a point. Contrary to this, FIG. 13 shows an embodiment with a stepped blade 9', in which the extension 22 extends a defined section of the respective blade 9' in the radial direction. Blade 9' has a stepped contour or a stepped free end as a result.

In addition, it can be determined from the views in FIGS. 11 through 13 that the blades 9 are preferably cut free from the sheet metal strip 16 such that a gap 23 is formed between adjacent blades 9. Contacts between adjacent blades 9, 9' in the finished sheet metal body 11 can be avoided due to this gap 23.

The injection means 6 and the mixing and/or evaporating device 7 are preferably coordinated with one another in the exhaust system 3 shown in FIG. 1 such that a single-jet or multi-jet educt jet generated by the injection means 6 reaches the blades 9 of device 7 radially outside the central core area 10. The educt jet preferably reaches the blades 9 exclusively within the axial path blocking annular surface 12. Dimensioning and adaptation is advantageously carried out such that the respective educt jet reaches the blades 9 exclusively outside the core area 10 and/or exclusively within the axial path blocking annular surface 12.

While specific embodiments of the invention have been shown and described in detail to illustrate the application of the principles of the invention, it will be understood that the invention may be embodied otherwise without departing from such principles.

What is claimed is:

1. An exhaust system for an internal combustion engine of a motor vehicle, the exhaust system comprising:
   an exhaust gas line removing exhaust gas from said internal combustion engine;
   an injection means arranged in said exhaust gas line for injecting a liquid educt into said exhaust gas line;
   at least one of a mixing and evaporating device comprising a tubular body with one axial end having a plurality of radially inwardly pointing blades, said blades being arranged adjacent to one another in a circumferential direction, said blades having an angle of incidence in relation to an axial direction, said tubular body being formed integrally with said blades from a shaped single sheet metal body, said at least one of a mixing and evaporating device being arranged in said exhaust gas line downstream of said injection means with exhaust gas flowing through said tubular body, wherein:
   said blades overlap in the circumferential direction such that a coaxially arranged surface is formed, said coaxially arranged surface blocking a straight axial path in the axial direction;
   said blades are designed and arranged such that one of: said surface formed by the overlapping of said blade is a circular surface with a central core area with a resistance to flow that is lower than a resistance to flow of a surrounding annular surface area and said surface formed by the overlapping of said blades is a surrounding annular surface area and encloses a central core area that is free of blade surface so as to not block a straight axial path; and
   said injection means and said mixing and evaporating device are coordinated with one another such that said injection means generates an educt jet, which meets said blades within said coaxially arranged surface radially outside the central core area.

2. An exhaust system in accordance with claim 1, wherein:
   said blades are arranged and designed such that said surrounding annular surface area is an axial path blocking surface that extends radially up to said tubular body;
   said blades located radially outside at a transition to said tubular body each have a respective profile in a plane that extends at right angles to the axial direction.

3. An exhaust system in accordance with claim 1, wherein:
   said blades are arranged and designed such that axially free gaps are formed radially outside said surface blocking a straight axial path in the axial direction between said blades, which are adjacent to each other in the circumferential direction;
   said blades located radially outside at a transition to said tubular body each have a respective profile in a plane that is sloped in relation to a plane extending at right angles to the axial direction.

4. An exhaust system for an internal combustion engine of a motor vehicle, the exhaust system comprising:
   an exhaust gas line removing exhaust gas from said internal combustion engine;
   an injection means arranged in said exhaust gas line for injecting a liquid educt into said exhaust gas line;
   at least one of a mixing and evaporating device comprising a tubular body with one axial end having a plurality of radially inwardly pointing blades, said blades being arranged adjacent to one another in a circumferential direction, said blades having an angle of incidence in relation to an axial direction, said tubular body being formed integrally with said blades as a one piece structure from a shaped single sheet metal body, said at least one of a mixing and evaporating device being arranged in said exhaust gas line downstream of said injection means with exhaust gas flowing through said tubular body, wherein:
   said blades overlap in the circumferential direction such that a coaxially arranged composite blade surface is formed that blocks a straight axial path through said at least one of a mixing and evaporating device said composite blade surface being one of a circular surface with a central core area with a resistance to flow that is lower than a resistance to flow of a surrounding annular surface area and a surrounding annular surface area enclosing a central core area that is free of blade surface so as to not block a straight axial path;
   said injection means and said at least one of a mixing and evaporating device are coordinated with one another such that said injection means generates an educt jet, which meets said blades only within said surrounding annular surface area of said coaxially arranged composite blade surface that blocks a straight axial path.

5. A device in accordance with claim 4, wherein
   said blades are arranged and designed such that said coaxially arranged surface extends radially up to said tubular body;
   said blades located radially outside at a transition to said tubular body each have a respective profile in a plane that extends at right angles to the axial direction.

6. A device in accordance with claim 5, wherein:
said blades are arranged and designed such that axially free gaps are formed radially outside said coaxially arranged surface between said blades, which are adjacent to each other in the circumferential direction;
said blades located radially outside at a transition to said tubular body each have a respective profile in a plane that is sloped in relation to a plane extending at right angles to the axial direction.

7. A device in accordance with claim 4, wherein at least one of:
said blades located adjacent to each other in the circumferential direction each adjoin each other radially outside at a transition to said tubular body via a rounded opening, and
said blades have an angle of incidence changing in a radial direction along said blade continuously or in increments in relation to the axial direction, wherein an angle of incidence decreases radially along said respective blade from the outside to the inside.

8. A device in accordance with claim 4, wherein said sheet metal body is a sheet metal strip, from which said blades are separated from each other by parallel cuts sloped in relation to said longitudinal direction of said sheet metal strip and in relation to which said separated blades are bent over each about a bending axis extending sloped or at right angles to said cuts.

9. An exhaust system for an internal combustion engine of a motor vehicle, the exhaust system comprising:
an exhaust gas line removing exhaust gas from said internal combustion engine;
an injection means arranged in said exhaust gas line for injecting a liquid educt into said exhaust gas line;
at least one of a mixing and evaporating device comprising a tubular body with one axial end having a plurality of radially inwardly pointing blades, said blades being arranged adjacent to one another in a circumferential direction, said blades having an angle of incidence in relation to an axial direction, said tubular body being formed integrally as a single piece structure with said blades from a shaped single sheet metal body, said at least one of a mixing and evaporating device being arranged in said exhaust gas line downstream of said injection means with exhaust gas flowing through said tubular body, wherein
said blades define a central core area and a coaxial annular surface blade area wherein said blades are designed and arranged such that a smaller resistance to flow becomes established in said core area than in said coaxial annular surface blade area; and
said injection means and said at least on of a mixing and evaporating device are coordinated with one another such that said injection means generates an educt jet, which only meets said blades radially outside said central core area.

10. A device in accordance with claim 9, wherein said blades overlap in the circumferential direction such that said coaxial annular surface blade blocks a straight axial path in the axial direction.

11. A device in accordance with claim 9, wherein
said blades are arranged and designed such that said coaxially arranged surface extends radially up to said tubular body;
said blades located radially outside at a transition to said tubular body each have a respective profile in a plane that extends at right angles to the axial direction.

12. A device in accordance with claim 9, wherein said blades are designed and arranged such that said core area forms a central passage opening.

13. A device in accordance with claim 9, wherein
said blades are designed and arranged such that said core area blocks a straight axial path.

14. A device in accordance with claim 9, wherein
at least two said blades have each a free blade end, which radially project into said core area,
other blades have free ends end each at said core area.

15. A device in accordance with claim 9, wherein at least one of:
said blades are designed and arranged such that they do not touch each other; and
said blades are designed and arranged such that they do not touch each other even with the mixing and/or evaporating device heated up to the operating temperature.

16. A device in accordance with claim 9, wherein said sheet metal body is a sheet metal strip, from which said blades are separated from each other by parallel cuts sloped in relation to said longitudinal direction of said sheet metal strip and in relation to which said separated blades are bent over each about a bending axis extending sloped or at right angles to said cuts.

* * * * *